(12) United States Patent
Todasco et al.

(10) Patent No.: US 10,692,083 B2
(45) Date of Patent: Jun. 23, 2020

(54) AUTOMATIC AUTHENTICATION FOR A USER WITH A SERVICE PROVIDER DURING A VOICE DATA CONNECTION TO A MERCHANT

(71) Applicant: PAYPAL, INC., San Jose, CA (US)

(72) Inventors: Michael Charles Todasco, Santa Clara, CA (US); Anand Lakshmanan, Sunnyvale, CA (US); Patrick Wong, San Mateo, CA (US); Brandye Sweetnam, San Jose, CA (US); Sumeet Ahuja, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 1129 days.

(21) Appl. No.: 14/809,091

(22) Filed: Jul. 24, 2015

(65) Prior Publication Data
US 2017/0024740 A1 Jan. 26, 2017

(51) Int. Cl.
*G06Q 40/00* (2012.01)
*G06Q 20/40* (2012.01)
(Continued)

(52) U.S. Cl.
CPC ......... *G06Q 20/4014* (2013.01); *G06Q 20/16* (2013.01); *G06Q 20/382* (2013.01);
(Continued)

(58) Field of Classification Search
CPC ............ G06Q 20/4014; G06Q 20/382; H04M 3/42059; H04M 3/42093; H04M 3/42102
See application file for complete search history.

(56) References Cited

U.S. PATENT DOCUMENTS

| 8,346,659 | B1 * | 1/2013 | Mohsenzadeh | ........ G06Q 20/00 705/35 |
| 2002/0059147 | A1 * | 5/2002 | Ogasawara | .......... G06Q 20/108 705/70 |

(Continued)

FOREIGN PATENT DOCUMENTS

| CN | 1946108 | * | 4/2007 | .............. H04M 3/42 |
| KR | 100657450 | B1 * | 12/2006 | ......... G06Q 30/0601 |

OTHER PUBLICATIONS

EIC 3600 Search Results, dated Nov. 14, 2018 (Year: 2018).*
(Continued)

*Primary Examiner* — Alexander G Kanlinowski
*Assistant Examiner* — William B. Bunker
(74) *Attorney, Agent, or Firm* — Haynes and Boone, LLP

(57) ABSTRACT

There are provided systems and methods for automatic authentication for a user with a service provider during a voice data connection to a merchant. A user may place a voice call to an entity, for example, through a plain old telephone service (POTS) or through voice over IP. The voice call may be detected by a service provider, which may determine whether the entity receiving the voice call requires authentication of the user during the voice call. The service provider may further determine whether the entity requires authentication of the user for use of an account with the service provider. The service provider may communicate information used to authenticate the user to the entity during the voice call. Additionally, the service provider may generate an authentication mechanism for the payment account, which may be used to authenticate use of the payment account by the user during the voice call.

20 Claims, 5 Drawing Sheets

(51) Int. Cl.
   *H04M 3/42*   (2006.01)
   *G06Q 20/38*  (2012.01)
   *G06Q 20/16*  (2012.01)

(52) U.S. Cl.
   CPC .... *H04M 3/42059* (2013.01); *H04M 3/42102* (2013.01); *H04M 2203/105* (2013.01); *H04M 2203/6081* (2013.01)

(56) References Cited

U.S. PATENT DOCUMENTS

| | | | | |
|---|---|---|---|---|
| 2003/0112936 A1* | 6/2003 | Brown | ................... | H04L 12/66 379/121.02 |
| 2005/0154649 A1* | 7/2005 | Jalili | ................... | G06Q 20/00 705/26.1 |
| 2008/0177662 A1* | 7/2008 | Smith | ................... | G06Q 20/24 705/44 |
| 2009/0070230 A1* | 3/2009 | Silverstein | ............ | G06Q 20/04 705/26.1 |
| 2011/0246363 A1* | 10/2011 | Stone | ................... | G06Q 20/02 705/44 |
| 2012/0130790 A1* | 5/2012 | Lyons | ................ | G06O 30/0224 705/14.25 |
| 2013/0346313 A1* | 12/2013 | Wankmueller | .......... | G06F 21/31 705/44 |
| 2014/0196118 A1* | 7/2014 | Weiss | ................... | H04L 63/0846 726/4 |
| 2014/0321627 A1* | 10/2014 | Brown | ................... | H04W 4/16 379/93.17 |
| 2015/0347734 A1* | 12/2015 | Beigi | ...................... | G06F 21/32 713/155 |
| 2016/0219150 A1* | 7/2016 | Brown | ................ | H04M 3/5235 |

OTHER PUBLICATIONS

Syed Zahidi Fadi Aloul and El-Hajj Wassim, "Two Factor Authentication Using Mobile Phones," IEEE Publication No. 978-1-4244-3806-8/09 (Year: 2009).*

"One-time password," Wikepedia, https://web.archive.org (Year: 2015).*

* cited by examiner

AUTOMATIC AUTHENTICATION FOR A USER WITH A SERVICE PROVIDER DURING A VOICE DATA CONNECTION TO A MERCHANT

TECHNICAL FIELD

The present application generally relates to secure and seamless account authentication during voice data streams and more specifically to automatic authentication for a user with a service provider during a voice data connection to a merchant.

BACKGROUND

Merchants may offer ordering services over voice connections with telecommunication devices, such as landline telephones, mobile phones over radio transmissions with a cellular network, and Voice over IP (VoIP) or other types of voice communications using Internet protocol networks. These systems may allow users to communicate with a merchant, merchant employee, and/or automated merchant device at the merchant endpoint from a user endpoint, such as a telephone, mobile smart phone, computer/tablet, etc. When establishing orders with merchants, users may be required to provide payment for items. For example, payment may be provided by a payment provider, which may utilize a payment account and/or financial instrument of the user to securely provide payment to the merchant. In order to utilize the payment account, the user may be required to authenticate their identity with the payment provider. In other embodiments, the user may be required to authenticate their identity with another service provider. However, if authentication credentials for the payment account are provided to the merchant, the user may incur increased time spent while establishing an order and risk of potential fraud. While the user may authenticate online or during delivery, such mechanisms increase work and friction during the transaction. Additionally, the merchant may wish for upfront authentication and/or payment from the user to prevent the risk of default by the user.

Figure 1:
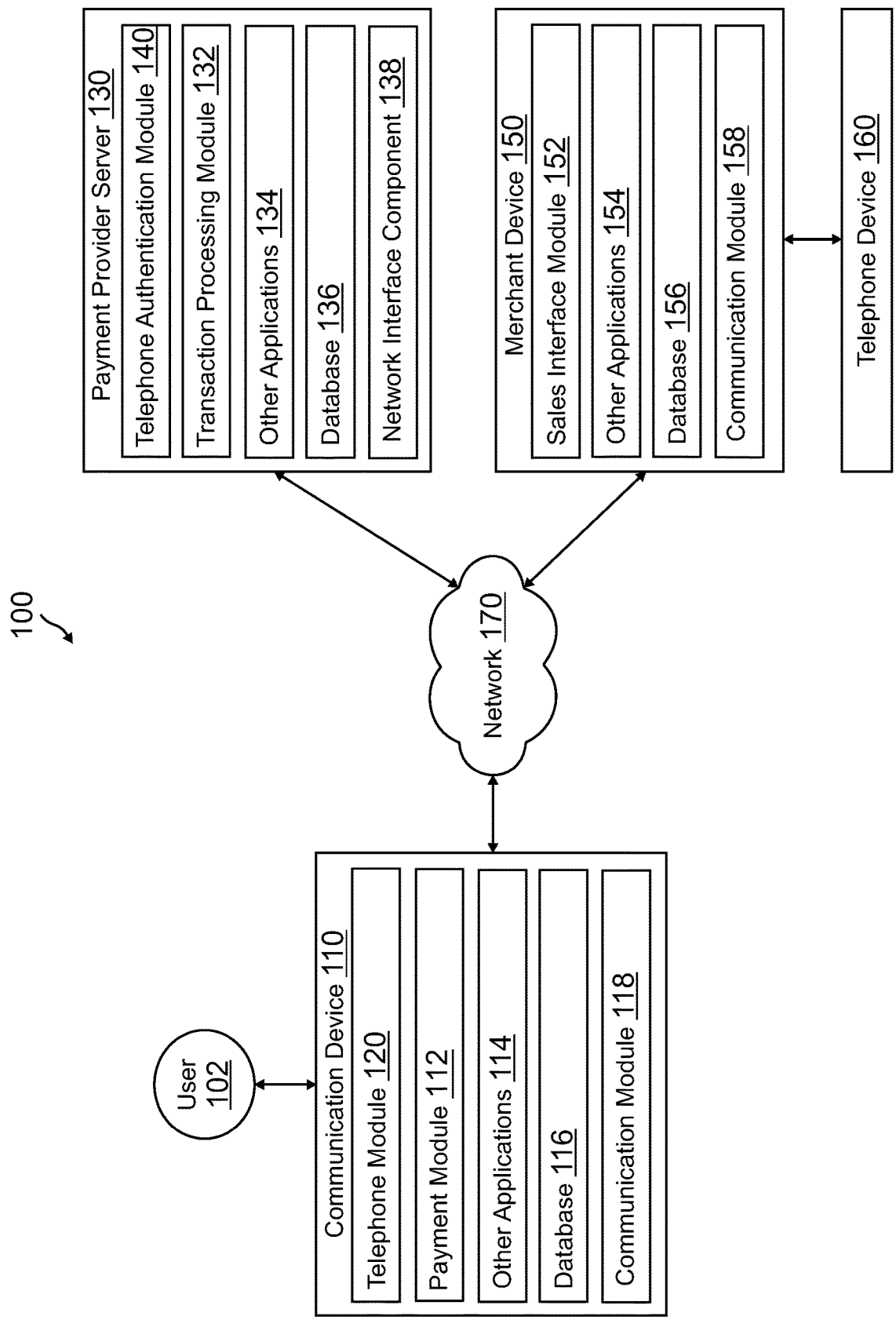
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automatic authentication for a user with a service provider during a voice data connection to a merchant. Systems suitable for practicing methods of the present disclosure are also provided.

A user may request to establish a voice data connection with a merchant, for example, over landline or wireless telecommunication devices using a plain old telephone service (POTS) through a public switched telephone network (PSTN) or using an Internet network connection over Internet protocol (IP) (e.g., Voice over IP (VoIP)). The user may utilize a communication device (e.g., a user endpoint) to establish the request by entering in an identifier for the merchant (e.g., the merchant endpoint), such as a phone number, IP address, messenger name, or other identification information for generating a connection to the merchant through the merchant endpoint. The user may utilize a phone or connection module of the user endpoint, which may include a keypad, keyboard, or other input means to enter in the identifier of the merchant. The user may also use a module associated with a service provider, such as a payment provider, to identify the merchant and request that a voice data connection be established with the merchant, a merchant employee for the merchant, and/or an automated merchant device at the merchant endpoint.

In various embodiments, the module of the communication device may establish the connection with the merchant, for example, using the PSTN or through a network connection (e.g., over the Internet using an IP address or other identifier used to locate the merchant on the Internet, including email addresses, messenger names, websites, etc.). Such connections may utilize another voice data connection service provider, for example, telephone service providers and/or online service providers of VoIP. However, in other embodiments where the user utilizes a module of the communication device associated with a payment provider or other service provider, the payment provider may facilitate the establishment of the voice data connection by receiving the request to establish the voice data connection with the merchant prior to use of a voice data connection service provider to establish the voice data connection.

The payment provider may be notified of the requested and/or established voice data connection by the communication device. For example, the payment provider may first receive the request to establish the voice data connection and may utilize a connection service provider to establish the connection on behalf of the user. In such embodiments, the user may directly connect to the payment provider from the user endpoint (e.g., call a number for the payment provider or connect to the payment provider's identifier/service), or may utilize an application associated with the payment provider to connect with the merchant (e.g., may dial the merchant's number or enter the merchant's online identifier through an application of the communication device endpoint for the user). However, in other embodiments the payment provider may receive information indicating that the user has requested to establish or established a voice data connection between the user endpoint and the merchant endpoint. For example, an application (e.g., a payment application of the payment provider) may execute in the background of an operating system of the user endpoint device and be configured to detect voice data connections with other endpoints. Thus, the payment provider may receive information indicating that the user is initiating a voice data connection with another entity, such as a merchant. The information may include a user identifier to identify the user as well as information identifying the merchant or other entity, such as the merchant identifier used to connect to the merchant endpoint.

Using the user identifier received when the payment provider detects the requested or established voice data connection, the payment provider may access an account of the user. The account of the user may be an account with the payment provider, such as a payment account used to send and receive money or other funds using the payment provider's service. Thus, the account may include financial information for the user and/or available funds for the user with the payment provider. The account may further include personal information, including a name, shipping/billing address, contact information, a social security number, date of birth, and/or other types of information a user may associated with an account. Usage of the account by the user and/or to receive payment by a merchant from the user may require authentication of the user. For example, access to the account may require the user to enter a user name, password, PIN, or other authentication credential. Moreover, the user may be required to authenticate their identity and presence when providing the account as a payment instrument during a transaction. Thus, the user may be required to provide authentication during a transaction with a merchant, where the authentication may be provided to the payment provider directly or to the merchant, which may communicate the authentication to the payment provider in order to receive payment.

Thus, the payment provider may automatically authenticate the user with the merchant prior to, on establishment of, and/or during the voice data connection between the user endpoint and the merchant endpoint. The payment provider may utilize the identifier of the user and the account of the user to authenticate the user for use of the payment account during the voice data connection. For example, the payment provider may know to trust the user based on the phone number and/or device identifier used to initiate the voice data connection. The payment provider may also analyze a location of the user endpoint device, a time of the voice data connection, and/or biometrics or other information collected by the device at the user endpoint to authenticate the user without requiring user input. However, the payment provider may require additional information, such as a PIN, if the merchant requires heightened authentication (e.g., for a large transaction), or if situational information for the voice data connection indicates potential fraud. For example, if the voice data connection is at a time the user rarely uses the device at the user endpoint, or from a different and/or remote location from the user's usual locations, the payment provider may require additional authentication.

The payment provider may also authenticate the user with the merchant by providing the merchant with user information and/or an authentication mechanism that allows the user to utilize the payment account of the user for purchases with the merchant during the voice data connection. Authentication with the merchant may also provide the identity of the user to the merchant, which may allow the merchant to identify and proceed with transactions with the user. For example, the payment provider may determine a code to provide to the user and/or the merchant which acts as an authentication mechanism and allows transaction processing of a payment to the user for items purchased by the user with the merchant during the voice data connection. In other embodiments, the payment provider may communicate, using data transmitted during the voice data connection (e.g., data transmitted through analog signals during a traditional phone call, through data transmitted over a network during an VoIP call, etc.), user information and an authentication token or credential to the merchant. The merchant may communicate the token/credential back to the payment provider during transaction processing to receive a payment. In further embodiments, the payment provider may generate a limited time use payment card number or pre-approved amount, which may be authorized with the merchant for use by the user and/or communicated to the merchant for use during transaction processing.

Thus, the payment provider may determine required authentication by the merchant. The required authentication may include accepted authentication for the user with associated payment instruments/mechanisms. The required authentication by the merchant may also include additional information used to authenticate the identity of the user with the merchant, including personal information, security procedures, etc. The payment provider may access merchant information to determine the required authentication and additional information. Additionally, the payment provider may analyze past transactions of the user, the user's current location, and/or other situational information, such as a time of day, to determine what information the merchant may require. Thus, the required authentication with the merchant may be dependent on additional factors, such as an update to a delivery address, authentication that the user is at a different location, and other information.

After determination of the authentication mechanism for use by the payment provider to authenticate the user with the merchant and/or authenticate the user for use of the payment account with the merchant, the payment provider may authenticate the user to the merchant during the voice data connection with the specific requirement authentication for the merchant and/or transaction. If the payment provider acts as an intermediary to receive the request to establish the voice data connection, the payment provider may further establish the connection between the user endpoint and the merchant endpoint. Once the connection is established, the payment provider may then authenticate the user to the merchant. As previously discussed, this may include communicating the authentication mechanism to the merchant endpoint device (e.g., authentication token for an account and/or user information to prove an identity of the user). However, in other embodiments, the user or the merchant may be provided with the code that links to the user's account and authenticates the user for use of the payment account. Such code may later be transmitted back to the payment provider by the merchant to allow for payment processing using the account. Moreover, in further embodiments, the user or merchant may receive the limited use funding instrument or credit card number, which may be used during the voice data connection for transaction processing. Where the authentication mechanism is provided to the user endpoint, the communication device at the user endpoint may display the code to the user for transmission to the merchant, which may include a menu option to transmit the authentication mechanism to the merchant. Moreover, the authentication mechanism may be limited in time, such as a predetermined amount of time or the length of the voice data connection, after which may be invalid, destroyed, and/or deleted. The merchant device may display to the merchant employee that the user is authenticated and/or approved for transaction processing, and may initiate a transaction with the user.

The payment provider and/or communication device at the user's endpoint may also provide menu options associated with the voice data connection. For example, based on the location of the user, the time of day, and/or other situational information for the user, a menu displayed on the user's communication device during the voice data connection may include intelligently selected menu options. Thus, if the user dials a food delivery merchant from home at 9:00 PM, the user may be presented with dinner menu options, potentially including past orders of the user (e.g., favorites), as well as other information to provide the merchant for a more fluid transaction (e.g., home delivery address, previous tip amounts, etc.).

In various embodiments, the above described authentication of the user with the payment provider and communication of an authentication mechanism and/or user information to a merchant may also be done with other entities. For example, the user may instead use voice connections with government agencies, service providers (e.g., television/Internet services, package delivery services, etc.), and/or other entities that may require user information and/or authentication of the user's identity. Thus, the payment provider or other service provider may also provide user information as described herein to such entities, and may generate authentication mechanisms allows for use of a user account with the payment/service provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a payment provider server 130, and a merchant device 150 in communication over a network 170. User 102 may utilize communication device 110 to utilize the various features available for communication device 110, which may include a telephone, VoIP, or other feature to communicate over a voice data connection. User 102 may connect to telephone device 160 associated with merchant device 150 over a voice data connection. User 102 may require authentication with merchant device 150 during the voice data connection with telephone device 160, which may be effectuated by payment provider server 130. For example, payment provider server 130 may detect that user 102 has initiated and/or established a voice data connection with telephone device 160 from communication device 110. Payment provider server 130 may authenticate user 102 and may provide user information and/or an authentication mechanism to merchant device 150 to authenticate the identity of user 102 to a merchant associated with merchant device 150. The authentication of user 102 with merchant device 150 may further authenticate user 102 to use a payment account with payment provider server 130 during the voice data connection between communication device 110 and merchant device 150.

Communication device 110, payment provider server 130, merchant device 150, and telephone device 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may correspond to a user endpoint for user 102 during a voice data connection. Communication device 110 may be implemented as a communication device that may utilize appropriate hardware and software configured for wired and/or wireless communication with payment provider server 130 and/or merchant device 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a telephone module 120, a payment module 112, other applications 114, a database 116, and a communication module 118. Telephone module 120, payment module 112, and other applications 114 may correspond to executable processes, procedures, and/or applications with associated hardware. In other embodiments, communication device 110 may include additional or different modules having specialized hardware and/or software as required.

Telephone module 120 may correspond to one or more processes to execute modules and associated specialized hardware of communication device 110 that may be used by user 102 of communication device 110 to request, initiate, receive, and/or otherwise establish a voice data connection with another endpoint, as well as receive, display, and transmit authentication mechanisms for user 102 and generate transactions based on displayable past transaction information. In this regard, payment module 112 may correspond to specialized hardware and/or software utilized by communication device 110 to provide an interface where user 102 may enter in an identifier for an entity, such as a merchant, government agency, etc. User 102 may enter a telephone number, an online address, a messenger name, or other identifier. Telephone module 120 may perform lookup of the identifier, for example, using another service provider such as a public switched telephone network (PSTN) or an online VoIP provider. The service provider may establish the connection between communication device 110 and the endpoint for the identifier, where telephone module 120 may be used to communicate with the endpoint, for example, using a microphone and/or speaker of communication device 110. In other embodiments, telephone module 120 may include processes associated with or incorporated in payment module 112, which may be associated with payment provider server 130. Thus, payment provider server may receive the request and utilize one of the aforementioned service providers to establish the connection with the requested endpoint using the identifier entered by user 102.

During the voice data connection, user 102 may be automatically authenticated with payment provider server 130 using information provided by telephone module 120 during request or establishment of the voice data connection. For example, telephone module 120 may provide an identifier for user 102, communication device 110, and/or an account of user 102 that may identify user 102 and be used with additional information to authenticate user 102 (e.g., a device identifier, originating phone number, IP address, etc.). Additional situation information may further be user to authenticate user 102 with payment provider server 130, such as a location, time, biometric, connected devices, or other information determined or retrieved by telephone module 120. Telephone module 120 may communicate the information to payment provider server 130, which may authenticate user 102. The authentication may be completed automatically when user 102 initiates the voice data connection and without user input.

As discussed herein, payment provider server 130 may determine an authentication mechanism that may be used to authenticate user 102 (e.g., prove user 102's identity) when received by another entity, for example, to allow a merchant to process a transaction using a payment account for user 102 as the payment instrument. The determination may be done by payment provider server 130 based on a user request for the authentication mechanism or automatically and without user input. Telephone module 120 may further receive the authentication mechanism, which may be displayed through an interface of telephone module. The authentication mechanism may be displayed during the voice data connection that the authentication mechanism is associated with. The authentication mechanism may be a code, which user 102 may provide to a merchant during the voice data connection, or may be a limited use payment card or funding account with associated identifier (e.g., account number, payment code, etc.). The authentication mechanism may also be a token or credential stored to communication device 110. User 102 may select a menu option, interface button, or voice input to communicate the authentication mechanism from communication device 110 to merchant device 150, or may verbally communicate the authentication mechanism to the merchant/merchant employee utilizing telephone device 160 during the voice data connection.

Payment module 112 may correspond to one or more processes to execute modules and associated devices of communication device 110 to initiate, receive, and/or process/complete transactions with a merchant associated with merchant device 150 using a payment account for user 102. In this regard, payment module 112 may correspond to specialized hardware and/or software utilized by communication device 110 to provide an interface to permit user 102 to select payment options and provide payment for items, for example, to the merchant associated with merchant device 150 using payment provider server 130. Payment module 112 may be implemented as a user interface enabling user 102 to enter payment options for storage by communication device 110, select and provide payment options on checkout/payment of one or more items with the merchant corresponding to merchant device 150, and complete a transaction for the item(s) through a purchase request for the item(s). In various embodiments, payment module 112 may include a general browser application configured to retrieve, present, and communicate information over the Internet (e.g., utilize resources on the World Wide Web) or a private network. For example, payment module 112 may provide a web browser, which may send and receive information over network 170, including retrieving website information, presenting the website information to user 102, and/or communicating information to the website, including payment information. However, in other embodiments, payment module 112 may include a dedicated application of payment provider server 130 or other entity (e.g., a merchant), which may be configured to assist in processing purchase requests. Moreover, in other embodiments, payment provider server 130 may not perform transaction processing, and may instead correspond to another service provider, where payment module 112 may include processes to access and utilize services provided by such a service provider, for example, another type of account provider that may offer shared and limited authentication for use of an account of user 102 by user 102.

Payment module 112 may be utilized to select payment instrument(s) for use during a transaction between user 102 and the merchant associated with merchant device 150, which may be used during a voice data connection. For example, user 102 may wish to complete a transaction with the merchant to purchase the item. Payment provider server 130 may determine an authentication mechanism for user 102 to utilize the selected payment instrument based on information available and/or selected from payment module 112. Payment module 112 may utilize user financial information, such as a credit card, bank account, or other financial account, as a payment instrument when providing payment information for use in the authentication mechanism. Additionally, payment module 112 may utilize a user account with payment provider, such as payment provider server 130, as the payment instrument. User 102 may therefore cause a transaction to be generated that includes a payment request to the merchant associated with merchant device 150 for one or more items for purchase during a voice data connection. The transaction may be communicated to payment provider server 130 for processing with the authentication mechanism by merchant device 150. Once the authentication mechanism is provided, payment provider server 130 may process the transaction. Payment module 112 may be utilized to view the results of the transaction and/or for viewing and storage of a transaction history, such as a receipt.

In various embodiments, one or more of the discussed hardware and/or software features of payment module 112 and telephone module 120 may be included in the same module.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may also include other location detection applications, which may be used to determine a location for user 102, such as a mapping, compass, and/or GPS application, which can include a specialized GPS receiver that obtains location information for communication device 110 and processes the location information to determine a location of the device. Other applications may include social networking applications and/or merchant applications. Other applications 114 may also be associated with other devices, such as biometric devices and other types of accessible or connected devices. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment module 112 and/or other applications 114, identifiers associated with hardware of communication device 110, or other appropriate identifiers, such as identifiers used for payment/user/device authentication or identification, which may be communicated as identifying user 102/communication device 110 as the originating endpoint for a voice data connection. Database 116 may include location information, such as obtained through the GPS receiver, which may be transmitted to payment provider server 130 and/or merchant device 150, as well as biometrics and other determined or retrieved information. Database 116 may further include information received as an authentication mechanism for identification of user 102 and/or use of user 102's payment account.

Communication device 110 includes at least one communication module 118 adapted to communicate with payment provider server 130, merchant device 150, and/or telephone device 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Payment provider server 130 may be maintained, for example, by an online payment service provider, which may provide payment services and/or processing for financial transactions on behalf of users. In this regard, payment provider server 130 includes one or more processing applications which may be configured to interact with communication device 110, merchant device 150, telephone device 160, and/or another device/server to facilitate payment for a transaction, including establishment of payment accounts and automatic authentication of user 102 during a voice data connection. In one example, payment provider server 130 may be provided by PAYPAL®, Inc. of San Jose, Calif., USA. However, in other embodiments, payment provider server 130 may be maintained by or include a credit provider, financial services provider, financial data provider, and/or other service provider, which may provide payment services to user 102.

Payment provider server 130 of FIG. 1 includes a telephone authentication module 140, a transaction processing module 132, other applications 134, a database 136, and a network interface component 148. Telephone authentication module 140, transaction processing module 132, and other applications 134 may correspond to executable processes, procedures, and/or applications with associated hardware. In other embodiments, payment provider server 130 may include additional or different modules having specialized hardware and/or software as required.

Telephone authentication module 140 may correspond to one or more processes to execute modules and associated specialized hardware of payment provider server 130 to perform telephone authentication of user 102 and authenticate user 102 with one or more other entities, including the merchant associated with merchant device 150. In this regard, telephone authentication module 140 may correspond to specialized hardware and/or software to detect that user 102 has requested to establish, initiated, and/or currently established and using a voice data connection with another entity, such a merchant correspond to merchant device 150 using telephone device 160. The voice data connection generated by communication device 110 as the user endpoint and another endpoint, such as an entity/merchant endpoint, may be detected based on information received from telephone module 120, as discussed herein. The information may include an identifier for user 102, communication device 110, or other identifier associated with at least one of the two, and may be used by telephone authentication module 140 to identify user 102 and retrieve account information for an account corresponding to user 102. The entity/merchant endpoint may correspond to telephone device 160, which may receive the voice data connection from communication device 110. As discussed herein, telephone authentication module 140 may receive information indicating the voice data connection. However, in other embodiments, telephone authentication module 140 may receive a request to establish the voice data connection and utilize a connection service provider to establish the voice data connection between the user endpoint and the entity/merchant endpoint.

Telephone authentication module 140 may authenticate an identity of user 102 using the identifier. In various embodiments, telephone authentication module 140 may further require additional information to authenticate user 102, such as location information or other situational information collected by communication device 110. Where the current information for user 102 differs from past known information for user 102 (e.g., when user 102 is attempting to authenticate from a new location or at a different time), telephone authentication module 140 may require user input (e.g., a user name, password, PIN, etc.) from user 102 through communication device 110.

After telephone authentication module 140 authenticates an identity of user 102 based on the voice data connection, telephone authentication module 140 may determine whether the entity associated with the endpoint contacted by user 102 using communication device 110 requires user information and authentication of user 102 and/or authentication required to allow user 102 to use a payment account associated with the entity. For example, telephone authentication module 140 may access entity/merchant information and determine required authentication for the entity. Telephone authentication module 140 may then authenticate user 102 to the entity during the voice data connection. The authentication with the entity may include providing the endpoint (e.g., merchant device 150) with information authenticating an identity of user 102. Additionally, the authentication may further include providing communication device 110 and/or merchant device 150 with an authentication mechanism allowing user 102 to utilize user 102's payment account with payment provider server 130 during transaction processing with merchant device 150.

For example, telephone authentication module 140 may communicate user information to merchant device 150 on detection of the voice data connection between communication device 110 and telephone device 160, which may be used by merchant device 150 to authenticate an identity of user 102 during the voice data connection. The user information may include user personal information and/or user financial information. For example, telephone authentication module 140 may provide merchant device 150 with a name, address, identifier, credential, payment information, date of birth, social security number, or other required information as determined using the merchant information.

The authentication with merchant device 150 may further include providing an authentication mechanism that allows user 102 to utilize a payment account for user 102 with a merchant associated with merchant device 150 during the voice data connection between communication device 110 and telephone device 160. The authentication mechanism may correspond to a code, which may be communicated to communication device 110 and/or merchant device 150. The code may be utilized during transaction processing by providing the code to transaction processing module 132 to authenticate user 102 and allow for transaction processing and payment using user 102's payment account. In various embodiments, an authentication token or credential, which may be encrypted, may function similarly to authenticate user 102 and allow for processing of user 102's payment account during a transaction to provide a payment. The code, token, and/or credential may correspond to limited use authentication credentials, which may be utilized by payment provider server 130 as authentication for use of the payment account. Additionally, in further embodiments, telephone authentication module 140 may instead pre-approve an amount of funds and generate a funding account or utilize a limited use credit/payment card number, which may be communicated to communication device 110 and/or merchant device 150 as authentication mechanism to use user 102's payment account for transaction processing and payment. Transaction processing module 132 may receive the authentication mechanism and process the transaction, as discussed herein. As previously discussed, the aforementioned authentication with merchant device 150 may also be done with other entities, such as governmental agencies, travel entities, service providers, and similar entities.

Telephone authentication module 140 may limit the authentication mechanism in validity. For example, the authentication mechanism may be limited for a certain amount of time, such as a predetermined time limit (e.g., the length of an average call, the length of past calls between the user endpoint and the entity endpoint, etc.) or the length of the voice data communication between user 102's endpoint (e.g., communication device 110) and the entity endpoint (e.g., telephone device 160 associated with merchant device 150). The authentication mechanism may also be limited based on the merchant information for the merchant corresponding to merchant device 150, past orders by user 102 with the merchant, and/or other users' orders with the merchant. Thus, the authentication mechanism may include limits on an amount of payment using user 102's payment account, merchants requesting payment using user 102's payment account, items purchase using user 102's payment account, and other limitations. The authentication mechanism may become invalid on expiration and/or incorrect/over user of the authentication mechanism. Moreover, the authentication mechanism may be deleted from communication device 110 and/or merchant device 150 after expiration.

Telephone authentication module 140 may communicate the authentication mechanism to use user 102's payment account to communication device 110 and/or merchant device 150 (e.g., to the user and/or entity/merchant endpoints) during the voice data connection. For example, telephone authentication module 140 may communicate the authentication mechanism to communication device 110 for user 102's review. As discussed herein, user 102 may then utilize telephone module 120 of communication device 110 to determine whether and when to transmit the authentication mechanism to merchant device 150. Additionally, telephone authentication module 140 may communicate the authentication mechanism to merchant device 150 during the voice data connection for use by the merchant/merchant employee associated with merchant device 150. Communicating the authentication mechanism to merchant device 150 may occur over a network 170 between payment provider server 130 and merchant device 150, for example, using data transfers during a VoIP call between communication device 110 and merchant device 150, where telephone device 160 is used by the merchant during the voice data connection. However, in other embodiments, payment provider server 130 may communicate the authentication mechanism to merchant device 150 through telephone device 160. In such embodiments, a telephone connection may be established between communication device 110 and telephone device 160 using a PSTN, where payment provider server 130 provides the authentication mechanism to merchant device 150 using analog data signaling during the voice data connection. Moreover, communication device 110 may similarly communicate the authentication mechanism to merchant device 150 as described above, where communication device 110 receives the authentication mechanism.

Telephone authentication module 140 may also be utilized to access transaction histories for user 102 and provide past transaction data to communication device 110. The past transaction data may be used by communication device 110 and/or telephone authentication module 140 to determine menu options within a displayable interface of communication device 110 during a voice data connection. The menu options may include orders for user 102 with a merchant, such as the merchant associated with merchant device 150. The menu option may also be intelligently selected based on a time of day, location, or other information about user 102, including biometrics, connected devices, nearby devices/users, etc. For example, menu options within the interface may be populated based on past orders at a home location, work location, or friend location, and/or based on a time of day. The menu options may be selected by user 102 in communication device 110 and communicated to merchant device 150 during the voice data connection in order to generate a transaction.

Transaction processing module 132 may correspond to one or more processes to execute modules and associated specialized hardware of payment provider server 130 to receive and/or transmit information from communication device 110 for establishing payment accounts for user 102 and processing one or more transactions initiated by user 102 during or after a voice data connection using the payment accounts on receipt of an authentication mechanism determined by telephone authentication module 140. In this regard, transaction processing module 132 may correspond to specialized hardware and/or software to establish payment accounts, which may be utilized to send and receive payments and monetary transfers and engage in other financial transactions. User 102 may establish a payment account with transaction processing module 132 by providing personal and/or financial information to payment provider server 130 and selecting an account login, password, and other security information. The payment account may be accessed and/or used through a browser application and/or dedicated payment application executed by communication device 110, such as an application associated with payment module 112. Thus, payment provider server 130 may protect and limit use of the payment account or other payment services offered by payment provider server 130 using authentication required by user 102. In other embodiments, payment provider server 130 may correspond to another type of service provider and transaction processing module 132 may correspond to another type of service module, which may require authentication for use of the payment account, as discussed herein.

Transaction processing module 132 may further process a received transaction from merchant device 150 by receiving the transaction having a payment request for a payment for the transaction. The payment request may correspond to a payment token, including the authentication mechanism and identification of the transaction, and may be encrypted prior to transmission to transaction processing module 132 to prevent unauthorized receipt of a payment instrument. The payment token may include information corresponding to user/merchant identifiers, transaction information and/or other information. Additionally, the payment token may include a payment amount as a payment request and terms of payment for the transaction. The payment token may further include an authentication mechanism used by user 102 to utilize the payment account of user 102. The authentication mechanism may be determine by telephone authentication module 140 and communicated to communication device 110 and/or merchant device 150, as discussed herein. Once the transaction is received and user 102 is authenticated, transaction processing module 132 may utilize the payment account for user 102 to render payment for the transaction if the authentication mechanism matches the required authentication. Payment may be made to merchant device 150 or another user device using the payment instrument and the terms of the payment request, or may be made to an account for a merchant associated with merchant device 150. Additionally, transaction processing module 132 may provide transaction histories, including receipts, to communication device 110 and/or merchant device 150, or may store the transaction histories to the user 102's account and/or the merchant's account.

In various embodiments, payment provider server 130 includes other applications 134 as may be desired in particular embodiments to provide features to payment provider server 134. For example, other applications 134 may include security applications for implementing server-side security features, programmatic client applications for interfacing with appropriate application programming interfaces (APIs) over network 170, or other types of applications. Other applications 134 may contain software programs, executable by a processor, including a graphical user interface (GUI), configured to provide an interface to user 102 when accessing payment provider server 134, where user 102 or other users may interact with the GUI to more easily view and communicate information. In various embodiments where not provided by transaction processing module 132, other applications 134 may include connection and/or communication applications, which may be utilized to communicate information to over network 170.

Additionally, payment provider server 130 includes database 136. As previously discussed, user 102 and/or the merchant corresponding to merchant device 150 may establish one or more payment accounts with payment provider server 130. Payment accounts in database 136 may include user/merchant information, such as name, address, birthdate, payment/funding information, additional user financial information, and/or other desired user data. User 102 and/or the merchant may link to their respective payment accounts through an account, user, merchant, and/or device identifier. Thus, when an identifier is transmitted to payment provider server 130, e.g. from communication device 110 and/or merchant device 150, a payment account belonging to user 102 and/or the merchant may be found. Database 136 may also store information received for a voice data connection, such as identifiers and situational information for user 102 and/or the endpoint entity. Database 136 may also store the authentication mechanism allowing for use of user 102's payment account, as well as identifiers used to identify user 102's payment account when submitted by user 102. Payment amounts may be deducted from one payment account and paid to another payment account.

In various embodiments, payment provider server 130 includes at least one network interface component 148 adapted to communicate communication device 110, merchant device 150, and/or telephone device 160 over network 170. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant device 150 may correspond to a point of sale (POS) and/or checkout machine/device, which may be connected with telephone device 160 and/or receive communications from telephone device 160. Merchant device 150 may be maintained, for example, by a merchant or seller offering various items, products, and/or services through the physical merchant location. Generally, merchant device 150 may be maintained by anyone or any entity that receives money, which includes charities as well as retailers and restaurants. In this regard, merchant device 150 may include a device having processing applications, which may be configured to interact with communication device 110, payment provider server 130, and/or telephone device 160 to facilitate the sale of items using one or more authentication mechanisms for the payment account associated with user 102. In various embodiments, merchant device 150 and telephone device 160 may be incorporated within the same device so as to provide their respective features in a single device.

Merchant device 150 may be implemented using any appropriate hardware and software configured for wired and/or wireless communication with communication device 110, payment provider server 130, and/or telephone device 160. For example, in one embodiment, merchant device 150 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may function similarly.

Merchant device 150 of FIG. 1 contains a sales interface module 152, other applications 154, a database 156, and a communication module 158. Sales interface module 152 and other applications 154 may correspond to processes, procedures, and/or applications executable by a hardware processor, for example, a software program. In other embodiments, merchant device 150 may include additional or different modules having specialized hardware and/or software as required.

Sales interface module 152 may correspond to one or more processes to execute modules and associated specialized hardware of merchant device 150 that provide checkout and payment processes, which may be configured to complete transactions for items. In this regard, sales interface module 152 may correspond to specialized hardware and/or software of merchant device 150 to provide a convenient interface to permit a merchant to enter, view, and/or edit items and/or services for purchase by user 102. For example, sales interface module 152 may be implemented as an application having a user interface enabling the merchant to enter item information and request payment for a transaction on checkout/payment of one or more items/services. In certain embodiments, sales interface module 152 may correspond more generally to a web browser configured to view information available over the Internet or access a website corresponding to the merchant and/or payment provider server 130. Sales interface module 152 may provide item sales through an online marketplace using the website of the merchant and/or through a physical location.

Sales interface module 152 may receive a transaction from a merchant or merchant employee input. For example, a merchant may receive an order from user 102 through a voice data connection between communication device 110 and telephone device 160. In other embodiments, sales interface module 152 may correspond to an automated sales service which may receive a transaction from user 102's input using communication device 110. In such embodiments, merchant device 150 and/or telephone device 160 may connect with communication device 110, for example over VoIP or a PSTN, respectively. User 102 may then enter the order to communication device 110, which may communicate the order to merchant device 150 and generate a transaction having a payment account. In various embodiments, sales interface module 152 may require authentication of an identity of user 102, such as user information, which may be communicated to merchant device 150 by payment provider server 130, as discussed herein.

Once a payment amount is determined for a transaction for items to be purchased by user 102, sales interface module 152 may request payment from user 102. Sales interface module 152 may receive an authentication mechanism for the payment account of user 102, as discussed herein. The authentication mechanism may correspond to the information used to authenticate user 102 to use user 102's payment account for payment. The provided information may then be used as an authentication credential and communicated to payment provider server 130 with the transaction and transaction information by sales interface module 152 for approval. As discussed herein, payment provider server 130 may perform matching on the provided authentication mechanism and the stored shared authentication's authentication mechanism and determine whether to approve or decline the transaction. Sales interface module 152 may then receive the results of the credential and transaction processing, and complete the transaction with user 102, for example, by providing the user the items for the transaction or declining the transaction where user 102 is not authenticated or the transaction is not authorized (e.g., insufficient funds).

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over network 170, or other types of applications. Other applications 154 may also include email, texting, voice and IM applications that allow a user to send and receive emails, calls, texts, and other notifications through network 170. In various embodiments, other applications 154 may include financial applications, such as banking, online payments, money transfer, or other applications associated with payment provider server 130. Other applications 134 may contain software programs, executable by a processor, including a graphical user interface (GUI) configured to provide an interface to the user.

Merchant device 150 may further include database 156 which may include, for example, identifiers such as operating system registry entries, cookies associated with sales interface module 152 and/or other applications 154, identifiers associated with hardware of merchant device 150, or other appropriate identifiers, such as identifiers used for payment/user/device authentication or identification. Identifiers in database 156 may be used by a payment/credit provider, such as payment provider server 130, to associate merchant device 150 with a particular account maintained by the payment/credit provider. Database 156 may further include a transaction between user 102 and a merchant corresponding to merchant device 150, as well as transaction information, input information for an authentication mechanism to authorize the transaction with payment provider server 130, and/or transaction confirmation and transaction histories.

Merchant device 150 includes at least one communication module 158 adapted to communicate with communication device 110 and/or payment provider server 130. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Telephone device 160 may correspond to a device used for voice communications with another endpoint, such as communication device 110. Telephone device 160 may correspond to a standalone device, which may receive voice data connections, such as a landline telephone, mobile phone, or other telephone type device, including an Internet connected phone configured to use VoIP or other network communication protocol. However, in other embodiments, merchant device 150 and telephone device 160 may be incorporated within the same device so as to provide their respective features in a single device. Telephone device 160 may receive requests to establish voice data connections and establish the voice data connections. During the voice data connections, telephone device 160 may be used to send and receive data through the connection, which may include receipt of user information and/or authentication (e.g., through analog signaling during a phone connection and/or data over a networked connection). Telephone device 160 may be connected to merchant device 150 and configured to provide received information to merchant device 150.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
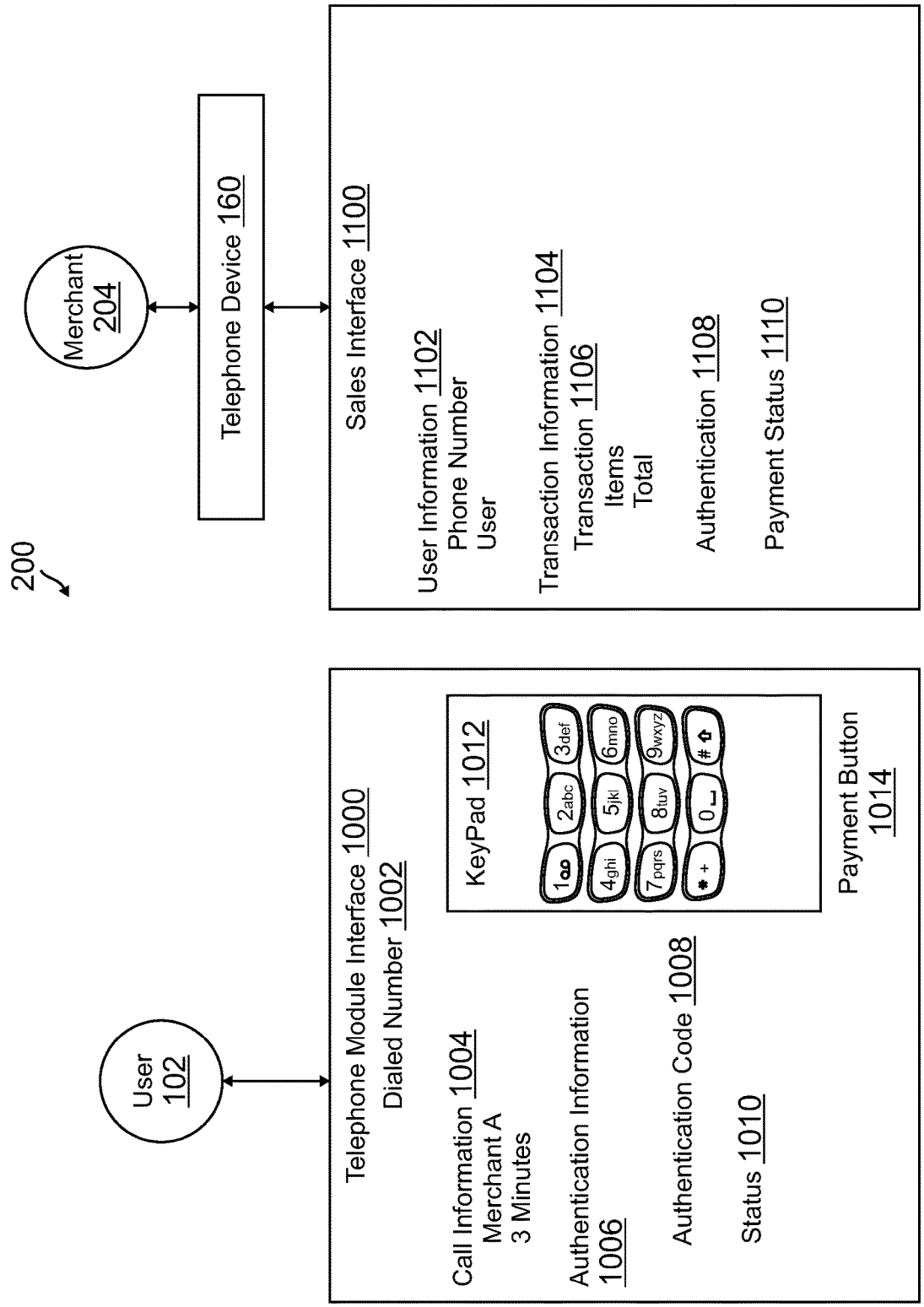
FIG. 2 is an exemplary interaction between a user and a merchant when performing automatic authentication of a user during a voice data connection with the merchant for use of the user's payment account, according to an embodiment.

FIG. 2 is an exemplary interaction between a user and a merchant when performing automatic authentication of a user during a voice data connection with the merchant for use of the user's payment account, according to an embodiment. Environment 200 includes user 102 from environment 100 of FIG. 1 viewing a telephone module interface 1000 associated with the described features and processes of telephone module 120 of environment 100. Environment 200 further includes telephone device 160 from environment 100 of FIG. 1 used by a merchant 204 and connected to a sales interface 1100 associated with the described features and processes of sales module interface 152 of environment 100.

User 102 may view telephone module interface 1000 when requesting to establish a voice data connection with another endpoint, such as a device associated with sales interface 1100. Thus, telephone module interface 1000 may be associated with a user input and display information a dialed number 1002, which may correspond to an identifier for the endpoint associated with sales interface 1100. Telephone module interface 1000 may further display call information 1004, which may include the name of dialed number 1002 and a length of the voice data connection. Telephone module interface 1000 may also display a receive authentication mechanism allow for user 102 to utilize user 102's payment account during a voice data connection by communicating the authentication mechanism to the endpoint associated with sales interface 1100 during the voice data connection. Thus, telephone module interface 1000 includes authentication information 1006, such as an authentication code 1008 and a status 1010 of the authentication mechanism. Further user 102 may utilize keypad 1012 to make selections, and may communicate authentication code 1008 by selecting payment button 1014.

User 102 may communicate with merchant 204 through telephone device 160, for example, over a voice data communication between an endpoint for telephone module interface 1000 and telephone device 160. Sales interface 1100 may be utilized to display a transaction between user 102 and merchant 204. Sales interface 1100 may display received user information 1102 used by merchant 204 to authenticate user 102 during the voice data connection, such as a phone number and user identifier (e.g., name, address, date of birth, etc.). Additionally, sales interface 1100 includes entered transaction information 1104, including a transaction 1106 for items and having a total. In order to receive payment for transaction 1106, merchant 204 may require authentication code 1008, which may be communicated during the voice data communication to telephone device 160 by the endpoint associated with telephone module interface 1000 or by user 102 to merchant 204 verbally. In other embodiments, a payment provider may communicate the authentication mechanism to telephone device 160. The authentication mechanism may be displayed as authentication 1108, and may include a payment status 1110 during transaction processing of transaction 1104 using authentication 1108.

Figure 3:
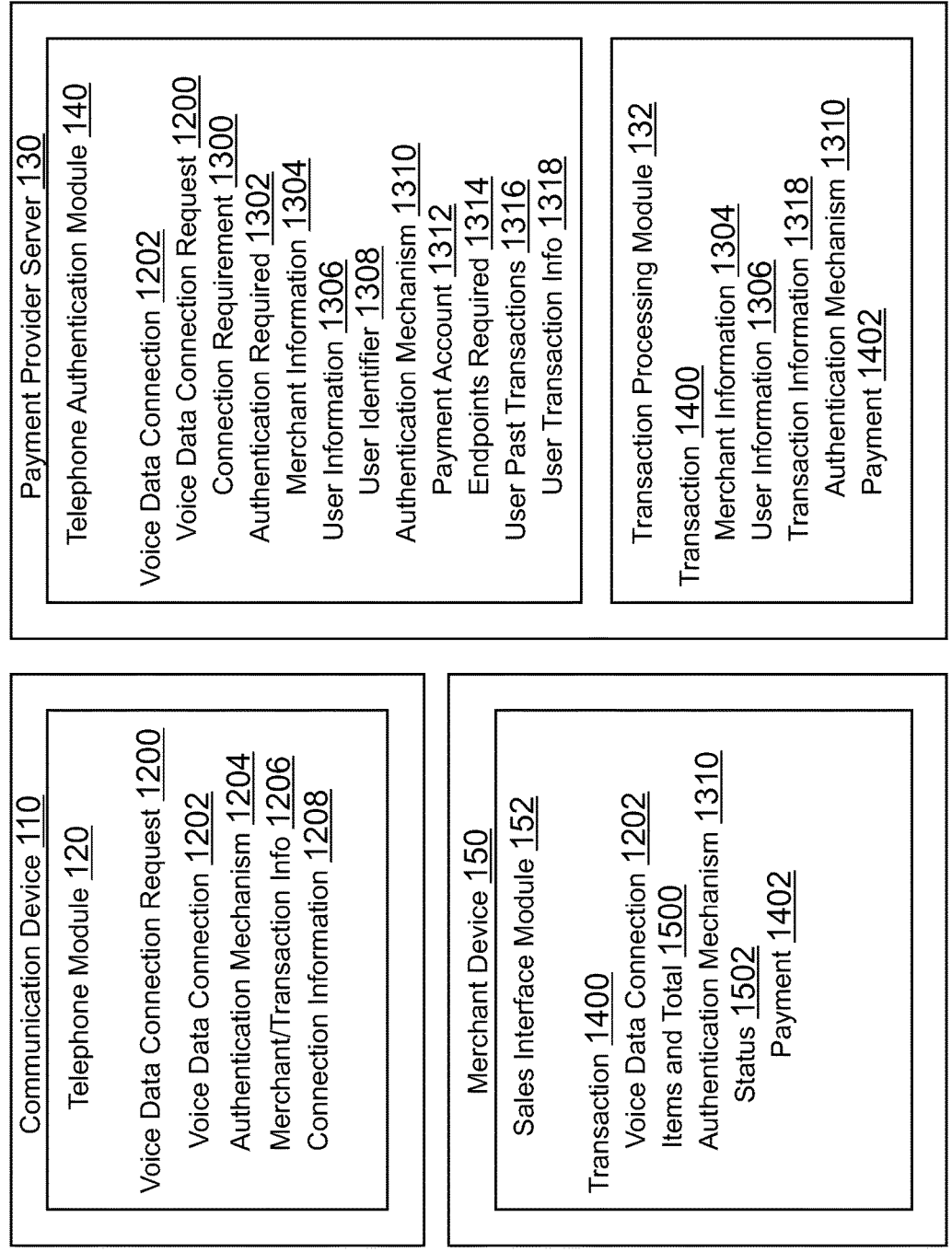
FIG. 3 is an exemplary interaction between a communication device, a payment provider server, and a merchant device for automatic authentication of a user during a voice data connection for use of the user's payment account, according to an embodiment.

FIG. 3 is an exemplary interaction between a communication device, a payment provider server, and a merchant device for automatic authentication of a user during a voice data connection for use of the user's payment account, according to an embodiment. Environment 300 of FIG. 3 includes communication device 110, a payment provider server 130, and a merchant device 150 from environment 100 of FIG. 1 executing module and processes discussed in reference to environment 100.

Communication device 110 executes telephone module 120 corresponding generally to the specialized hardware and/or software modules and processes described in reference to FIG. 1. In this regard, telephone module 120 may be used to request a voice data connection with another entity's endpoint, such as a merchant endpoint corresponding to merchant device 150. Thus, telephone module 120 includes a voice data connection request 1200, which may be communicated for connection to the endpoint corresponding to merchant device 150. For example, voice data connection request may be transmitted to a connection service provider, which may connect the two endpoints or to payment provider server 130, which may utilize the connection service provider to connect the two endpoints. Voice data connection request 1200 may be associated with a voice data connection 1202. During voice data connection 1202, telephone module 120 may receive an authentication mechanism 1204, which may be used to allow use of a payment account associated with the user of communication device 110. Additionally, telephone module 120 may include merchant/transaction information 1206 and connection information 1208.

Payment provider server 130 executes telephone authentication module 140 corresponding generally to the specialized hardware and/or software modules and processes described in reference to FIG. 1. In this regard, telephone authentication module 140 may include information for a voice data connection 1202. On detection of voice data connection request 1200 for voice data connection 1202, telephone authentication module 140 may determine connection requirement 1300, such as whether the voice data connection request 1200 require a connection service provider to establish a connection. Voice data connection 1202 may further be used to determine authentication 1302 based on merchant information 1304, which may correspond to information required to authenticate a user by the merchant corresponding to merchant device 150. Voice data connection 1202 may include user information 1306 determined from voice data connection 1202, such as a user identifier 1308. User identifier 1308 may be used to determine a user payment account for the user associated with communication device 110. Once the payment account is determined, telephone authentication module 140 may determine an authentication mechanism 1310, for example, using payment account 1312 determined using user identifier 1308, and endpoints required 1314 determined using authentication required 1302. Additionally, telephone authentication module 140 may utilize user past transactions 1316, such as user transaction information 1318, to provide intelligent menu options during a voice data connection.

Merchant device 150 executes sales interface module 152 corresponding generally to the specialized hardware and/or software modules and processes described in reference to FIG. 1. In this regard, sales interface module 152 may be used to generate a transaction 1400, receive information for a credential by a user, and submit the transaction and credential information to payment provider server 130 for approval. Thus, transaction 1400 may be established during voice data connection 1202, which may include items and total 1500. During voice data connection 1202, merchant device 150 may receive authentication mechanism 1310 from communication device 110 or payment provider server 130 for use in authenticating the user for use of the user's payment account during transaction 1400. Authentication mechanism 1310 includes status 1502 during transaction processing, which may display a payment 1402 if transaction 1400 is processed.

Payment provider server 130 further executes transaction processing module 132 corresponding generally to the specialized hardware and/or software modules and processes described in reference to FIG. 1. In this regard, transaction processing module 132 includes transaction 1400 received from sales interface module 152 with authentication mechanism 1310 for transaction processing. Transaction 1400 may be included with merchant information 1304, user information 1306, and transaction information 1318. For example, transaction information 1318 may include authentication mechanism 1310, which may be processed to utilize the user's payment account in order to effectuate payment 1402 to the merchant.

Figure 4:
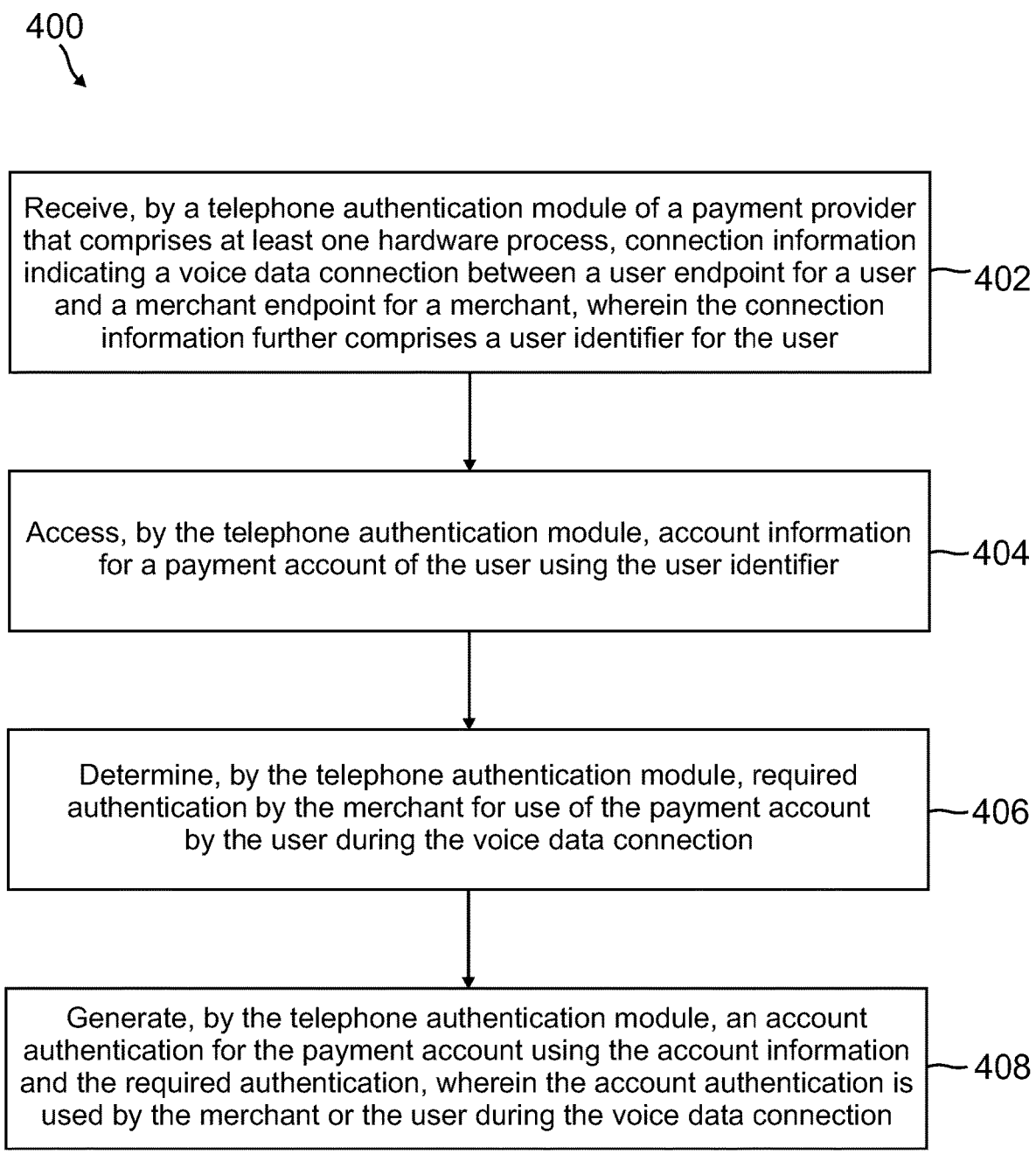
FIG. 4 is a flowchart of an exemplary process for automatic authentication for a user with a service provider during a voice data connection to a merchant, according to an embodiment.

FIG. 4 is a flowchart of an exemplary process for automatic authentication for a user with a service provider during a voice data connection to a merchant, according to an embodiment. Note that one or more steps, processes, and methods described herein may be omitted, performed in a different sequence, or combined as desired or appropriate.

At step 402, connection information indicating a voice data connection between a user endpoint for a user and a merchant endpoint for a merchant is received, by a telephone authentication module of a payment provider that comprises at least one hardware processor, wherein the connection information further comprises a user identifier for the user. The merchant may use the authentication for use of the payment account of the user to generate a transaction between the user and the merchant, wherein the merchant processes the transaction using the payment account. The merchant may comprise an entity required at least one of personal information and financial information.

Account information for a payment account of the user is accessed, by the telephone authentication module, using the user identifier, at step 404. At step 406, required authentication by the merchant for use of the payment account by the user during the voice data connection is determined, by the telephone authentication module. An account authentication for the payment account is generated using the account information and the required authentication, by the telephone authentication module, wherein the account authentication is used by the merchant or the user during the voice data connection, at step 408. The account authentication may comprise user information, wherein the user information comprises at least one of an address, a date of birth, a social security number, and a contact address. Where the merchant is instead an entity, the user information may be specific to a requirement for identity authentication by the entity. The entity may be a government agency requiring the user information during the voice data connection.

A transaction processing module of the payment provider may receive a transaction generated by the merchant from the merchant endpoint during the voice data connection and process the transaction based on authenticating the user by the telephone authentication module. In various embodiments, prior to the merchant endpoint generating the transaction, the user endpoint displays at least one menu option of a common order of the user, wherein the common order is based on at least one of past user transactions, a current user location, and a current time of day.

In various embodiments, the account authentication may include authenticating the user by the telephone authentication module for example, comprising generating a code that authenticates the user for use of the payment account, wherein receipt of the code by the payment provide authenticates the user and allows use of the payment account for providing a payment to the merchant. The code may be valid for a limited time. The authenticating the user by the telephone authentication module may instead comprise providing an authentication token for the payment account to the merchant endpoint, wherein the merchant endpoint communicates the user authentication to the payment provider during processing a transaction between the user and the merchant. The authentication token may be valid for a limited time, for example, the limited time may be one of a predetermined amount of time and a length of the voice data connection. The authentication token may be deleted from the merchant endpoint after ending the voice data connection. The authenticating the user by the telephone authentication module may also comprise communicating an authentication mechanism to the merchant endpoint using data communicated to the merchant endpoint by the payment provider during the voice data connection.

As such, a user may be authenticated with a recipient of a call by a third party, such as a payment or service provider, resulting in less work and time for the user to provide needed authentication information. Authentication information provided by the third party may be at any time during the call and may vary depending on what is determined to be the needed information. For example, one recipient may only need the last four digits of the user's social security number (SSN), another recipient may need the last four digits of the SSN and date of birth, another recipient may need the user's mother's maiden name, while yet another recipient may need a password or PIN. Information may also differ based on a reason for the call, even if with the same recipient. For example, a purchase may need more confidential and/or additional information about the user, while a request for status of a product may only require a home zip code. Furthermore, after authentication through a mobile communication device, such as a smart phone, any call made through the app may enable the app provider to authenticate the user to the recipient. In this case, after authentication, the user may see icons of individual merchants or callees (such as ones the user has called before, called frequently, or selected), such that the user may simply tap or otherwise select the icon or other visual indicator (such as a link) to initiate the call to the desired callee and be authenticated as discussed herein.

Figure 5:
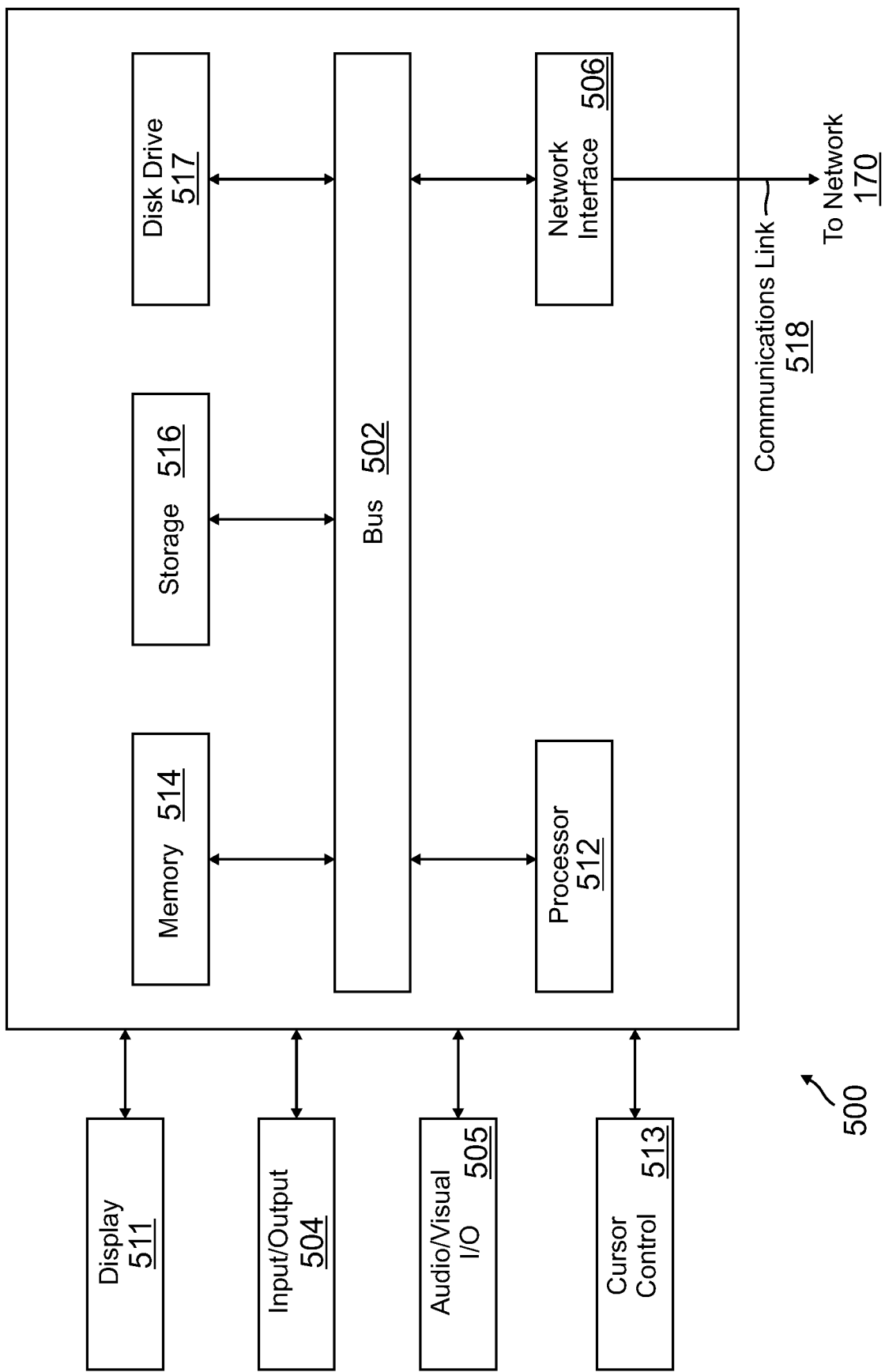
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A telephone authentication system comprising:
a non-transitory memory; and
one or more hardware processors coupled to the non-transitory memory and configured to read instructions from the non-transitory memory to cause the telephone authentication system to perform operations comprising:
receiving a request to initiate a voice data connection with a callee from a user endpoint for a user, wherein the request includes a user identifier for the user;
determining a callee identifier for a callee endpoint of the callee;
connecting the user endpoint to the callee endpoint through the voice data connection using the callee identifier for the callee endpoint, wherein the user endpoint and the callee endpoint are separate from a server of the telephone authentication system and comprise telephonic devices for the voice data connection;
accessing account information for an account of the user using the user identifier during the voice data connection;
authenticating the user for use of the account with the callee using the account information during the voice data connection;
generating a user authentication code that authenticates the user for use of the account with the callee during the voice data connection based on the account information, wherein the user authentication code is a one-time code having a limited validity duration for the voice data connection;

in response to the authenticating, providing first data within an application interface on the user endpoint, wherein the first data comprises a field for displaying the user authentication code, a field for displaying a menu option to purchase items from the callee, and an input element associated with processing a payment using the account of the user;

providing second data within a callee sales interface on the callee endpoint, wherein the second data comprises a field for displaying user information for the user, a field for displaying an item to be purchased by the user, and a field for displaying the user authentication code, wherein the first data and the second data are provided separate from voice communications during the voice data connection;

causing to be displayed, by the telephone authentication system, the user authentication code in the application interface of the user endpoint during the voice data connection;

in response to receiving a selection of the input element from the application interface, communicating, by the telephone authentication system, the user authentication code to the callee endpoint during the voice data connection;

causing the user authentication code to be displayed in the callee sales interface during the voice data connection;

receiving the user authentication code from the callee endpoint during the voice data connection for the payment from the account of the user to the callee; and processing, during the voice data connection, the payment to the callee based on transaction data and the user authentication code received from the callee endpoint during the voice data connection.

2. The telephone authentication system of claim 1, wherein the transaction data causes a transaction for the transaction data to be generated and processed using the account.

3. The telephone authentication system of claim 1, wherein a receipt of the user authentication code by the telephone authentication system authenticates the user.

4. The telephone authentication system of claim 1, wherein the user authentication code is valid for use in a transaction comprising the payment during the voice data connection, and wherein the limited validity duration comprises a length of the voice data connection.

5. The telephone authentication system of claim 1, wherein the authenticating the user further comprises providing an authentication token for the account to the callee endpoint.

6. The telephone authentication system of claim 5, wherein the authentication token is valid for a limited time with the callee.

7. The telephone authentication system of claim 6, wherein the limited time is one of a predetermined amount of time or a length of the voice data connection.

8. The telephone authentication system of claim 5, wherein the authentication token is deleted from the callee endpoint after ending the voice data connection.

9. The telephone authentication system of claim 1, wherein the authenticating the user further comprises communicating an authentication mechanism to the callee endpoint by the telephone authentication system during the voice data connection.

10. The telephone authentication system of claim 1, wherein the callee comprises an entity that requires at least one of personal information or financial information from the user during the voice data connection.

11. The telephone authentication system of claim 1, wherein the operations further comprise:
receiving the transaction data generated by the callee from the callee endpoint during the voice data connection; and
processing the transaction data based on the authenticating the user.

12. A method comprising:
receiving, by a telephone authentication module of a payment provider server that comprises at least one hardware processor, connection information indicating a voice data connection between a user endpoint for a user and an entity endpoint for an entity, wherein the connection information further comprises a user identifier for the user, and wherein the user endpoint and the entity endpoint are separate from the payment provider server and comprise telephonic devices for the voice data connection;

accessing, by the telephone authentication module, account information for a payment account of the user based on the user identifier during the voice data connection;

generating a user authentication code that authenticates the user for use of the payment account with the entity during the voice data connection based on the account information, wherein the user authentication code is a one-time code having a limited validity duration for the voice data connection;

providing first data within an application interface on the user endpoint, wherein the first data comprises a field for displaying the user authentication code, a field for displaying a menu option to purchase items from the entity, and an input element associated with processing a payment using the payment account of the user;

providing second data within an entity interface on the entity endpoint, wherein the second data comprises a field for displaying user information for the user, a field for displaying an item to be purchased by the user, and a field for displaying the user authentication code, wherein the first data and the second data are provided separate from voice communications during the voice data connection;

determining, by the telephone authentication module, required authentication by the entity during the voice data connection;

communicating, by the telephone authentication module, the required authentication to the entity endpoint during the voice data connection;

causing to be displayed, by the payment provider server, the user authentication code in the application interface of the user endpoint during the voice data connection;

in response to receiving a selection of the input element from the application interface, communicating, by the payment provider server, the user authentication code to the entity endpoint during the voice data connection;

causing the user authentication code to be displayed in the entity interface during the voice data connection;

receiving the user authentication code from the entity endpoint during the voice data connection for the payment from the payment account of the user to the entity; and processing, during the voice data connection, the payment to the entity based on transaction data and the user authentication code received from the entity endpoint during the voice data connection.

13. The method of claim 12, wherein the required authentication further comprises user information, and wherein the user information comprises at least one of an address, a date of birth, a social security number, or a contact address.

14. The method of claim 13, wherein the user information is specific to a requirement for identity authentication by the entity.

15. The method of claim 14, wherein the entity is a government agency requiring the user information during the voice data connection.

16. The method of claim 13, wherein the entity is a merchant, wherein the user endpoint is a mobile device and the entity endpoint is a merchant telephone device or a merchant point of sale device, wherein the voice data connection is a telephone call by the mobile device to the merchant telephone device or the merchant point of sale device, and wherein the telephone call is detected by the payment provider server using a mobile application of the mobile device.

17. The method of claim 16, wherein the telephone call is to the payment provider server directly or through the mobile application by the mobile device.

18. A non-transitory computer-readable medium comprising executable modules which, in response to execution by a computer system, cause the computer system to perform operations comprising:

receiving, by a telephone authentication module of a payment provider server that comprises at least one hardware processor, connection information indicating a request to establish a voice data connection between a user endpoint for a user and a merchant endpoint for a merchant, wherein the connection information further comprises a user identifier for the user, and wherein the user endpoint and the merchant endpoint are separate from the payment provider server and comprise telephonic devices for the voice data connection;

accessing, by the telephone authentication module, account information for a payment account of the user using the user identifier during the voice data connection;

determining, by the telephone authentication module, an authentication code to authenticate the user for use of the payment account with the merchant when received by the payment provider server during the voice data connection, wherein the authentication code is a one-time code having a limited validity duration for the voice data connection;

communicating, by the telephone authentication module, the authentication code to the user endpoint prior to establishment or during the voice data connection;

determining, by the payment provider server, a past transaction associated with the merchant based on the connection information and a transaction history for the payment account;

generating, by the payment provider server, a menu option for an application interface of the user endpoint, wherein the menu option comprises transaction data associated with the past transaction that is selectable through the application interface during the voice data connection;

providing first data within the application interface on the user endpoint, wherein the first data comprises a field for displaying the authentication code, a field for displaying the menu option to purchase items from the merchant, and an input element associated with processing a payment using the payment account of the user;

providing second data within a merchant sales interface on the merchant endpoint, wherein the second data comprises a field for displaying user information for the user, a field for displaying an item to be purchased by the user, and a field for displaying the authentication code, wherein the first data and the second data are provided separate from voice communications during the voice data connection;

causing to be displayed, by the payment provider server, the authentication code and the menu option in the application interface of the user endpoint during the voice data connection;

in response to receiving a selection of the input element from the application interface and the menu option, communicating, by the payment provider server, the authentication code and the transaction data associated with the menu option to the merchant endpoint during the voice data connection;

causing the authentication code to be displayed in the merchant sales interface during the voice data connection;

receiving the authentication code with the transaction data from the merchant endpoint during the voice data connection for the payment from the payment account of the user to the merchant; and processing, during the voice data connection, the payment to the merchant based on the transaction data and the authentication code received from the merchant endpoint during the voice data connection.

19. The non-transitory computer-readable medium of claim 18, wherein the transaction data comprises a payment request between the user and the merchant, and wherein prior to processing the payment, the operations further comprise:

receiving, by a transaction processing module of the payment provider server, the authentication code from the merchant endpoint; and authenticating, by the transaction processing module, the user for use of the payment account using the authentication code.

20. The method of claim 12, further comprising:

determining user information for the user during the voice data connection through the user endpoint; and determining that the voice data connection is trusted between the user endpoint and the entity endpoint based on the user information and past user information available for the user, wherein the user authentication code token is generated in response to determining that the voice data connection is trusted.

* * * * *